F. D. VAN NORMAN.
SPINDLE BEARING LUBRICATING DEVICE.
APPLICATION FILED JULY 21, 1910.
1,099,218.
Patented June 9, 1914.
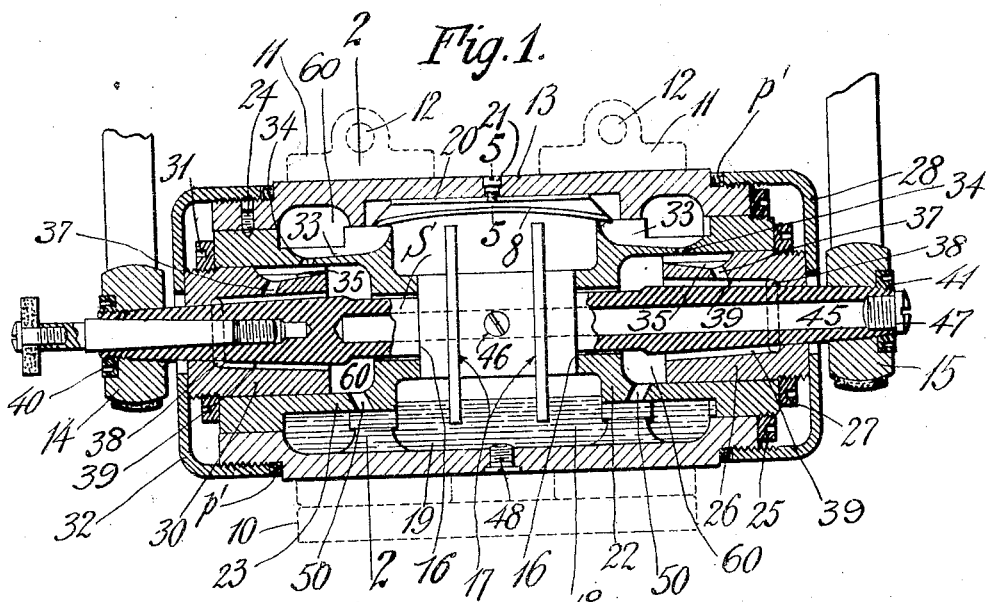
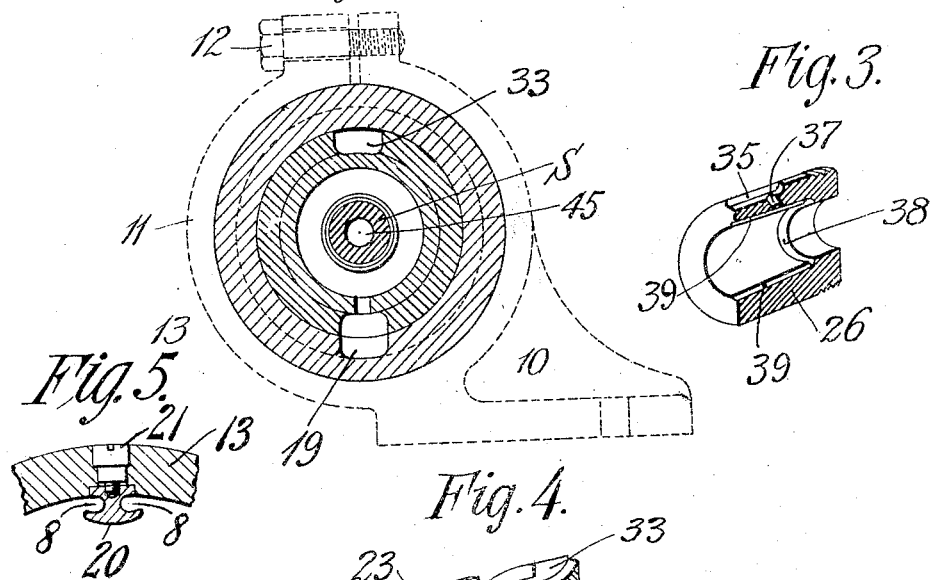
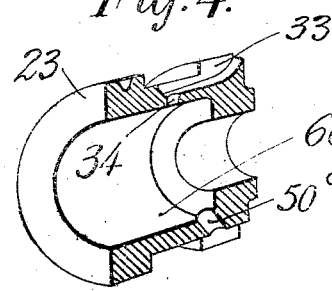
WITNESSES:
INVENTOR.
Frederick D. Van Norman
BY
ATTORNEY.

UNITED STATES PATENT OFFICE.

FREDERICK D. VAN NORMAN, OF SPRINGFIELD, MASSACHUSETTS, ASSIGNOR, BY MESNE ASSIGNMENTS, TO VAN NORMAN MACHINE TOOL COMPANY, OF SPRINGFIELD, MASSACHUSETTS, A CORPORATION OF MASSACHUSETTS.

SPINDLE-BEARING-LUBRICATING DEVICE.

1,099,218.      Specification of Letters Patent.      Patented June 9, 1914.

Application filed July 21, 1910. Serial No. 573,011.

*To all whom it may concern:*

Be it known that I, FREDERICK D. VAN NORMAN, a citizen of the United States of America, and resident of Springfield, in the county of Hampden and State of Massachusetts, have invented certain new and useful Improvements in Spindle-Bearing-Lubricating Devices, of which the following is a full, clear, and exact description.
This invention relates to bearings for high speed spindles, and more particularly to that class thereof which, by virtue of the work to be done by them, should as a matter of precaution be guarded against dust, grit, etc., conditions such as are for instance found in grinding machines or attachments in which a close adjustment is, furthermore, essential to avoid all unnecessary looseness or play between the bearings and the spindle supported thereby.

The invention has for its object the provision of means whereby the several parts may be inclosed in what may be considered a dust proof casing, and in which constant lubrication of the running parts will take place by virtue of a lubricant-distributing member which is carried on the spindle and whereby said lubricant will be automatically distributed to all the wearing surfaces in a liberal and effective manner whenever the spindle is running.

Briefly stated, the casing contains a lubricant well within which the lubricant-distributing member on the spindle is partly immersed, so that when the spindle is running, the lubricant will be thrown by centrifugal force against the inner side of the casing and will then gravitate toward the bearings through a series of oil-grooves or channels, any overflow returning into the lubricant well in the casing.

The invention has been clearly illustrated in the accompanying drawings in which—

Figure 1 shows a longitudinal section of my improved device. Fig. 2 is a cross section on line 2, 2 of Fig. 1. Fig. 3 is a sectional perspective view of one of the bearing sleeves which are in direct contact with the spindle itself, and showing the ducts or oil grooves through which the lubricant is enabled to contact with the spindle, and Fig. 4 is a similar view of the bearing-sleeve holder preferably employed in my device. Fig. 5 is a partial cross section on line 5—5, Fig. 1.

In the drawings, the numeral 10, denotes the stationary head of a grinding machine, comprising straps 11 which may be contracted by screws 12 to hold the casing-shell 13 in which the several parts of my improved bearing are mounted.

In the present instance, the grinding spindle S is shown as being supported in a pair of end bearings, and driven by a pair of small pulleys 14, 15 disposed at the opposite ends thereof. The spindle S is preferably provided with a pair of shoulders 16, and also carries a flange or disk 17 or more than one thereof, as here particularly shown, of such size as to dip into the lubricant 18 contained within an oil well 19 of the casing 13, the interior of which may be filled to the desired level in a direct manner through any suitable aperture therefor.

At the upper internal portion or "roof" of the casing 13 is fitted a piece 20 which has a flat top and is held in its longitudinally ranging position by the screw 21, and which piece has opposite channels or gutters 8, 8, which are sidewise open and also open endwise whereby the lubricant which may be thrown into said channels by the rapidly rotating disk or disks 17 is carried in both directions longitudinally of the casing toward and for delivery into oil pockets 33, 33, provided in members to be hereinafter more particularly referred to.

The shoulders 16 are adapted to take up the end-thrust in opposite directions of the spindle S inasmuch as they contact with the oppositely disposed inner end faces of a pair of thrust-resisting members or bearing holders 22, 23, the latter of which is preferably held stationary within the casing shell 13, either rotatively or longitudinally, as for instance by a binding screw 24; while the former 22, may be adjusted longitudinally by a ring-nut 25 whereby the inward movement of the holder 22 may be accurately gaged and limited relatively to the casing shell 13.

By referring to Fig. 1 it will be seen that a bearing sleeve 26 is mounted for longitudinal adjustment in the holder 22 and that the positions of these two elements relative to each other are controlled by a ring-nut 27, in screw threaded engagement with the bearing 26 and resting against the outer face of the holder 22.

The outer end of the bearing sleeve 26 is engaged by a cap 28 in screw threaded engagement with the end of the casing 13, so that by these means the bearing sleeve 26, the holder 22, and the casing 13 are immovably held together as will be readily understood.

The inner face of the bearing sleeve 26 is preferably tapered to correspond with the taper of that end of the spindle S. Hence it will be seen that by loosening the ring-nut 27, the bearing 26 may be moved longitudinally of the axis of the spindle S until the proper running fit has been obtained and the ring-nut 27 may then be rotated until it comes into engagement with the outer face of the holder 22, and then serves as a checknut or collar whereby any further inward movement of the bearing sleeve 26 will be prevented when the cap 28 is rotated to draw the different elements into place. In order to make the casing oil tight at this end, a packing $p'$ may be employed, as shown in Fig. 1.

The same construction applies to the other end of the casing where the bearing sleeve 30 has a conical bore to correspond to the taper of the spindle at that end and it is provided with a ring-nut 31 adapted to engage the outer face of the holder 23 to limit the inward movement of the bearing 30 which may then be held against outward movement by a cap 32 in screw threaded engagement with the left hand end of the casing, as shown. Packing $p'$ may be applied here just the same as it was in the case previously described to make the casing oil tight.

The bearing holders 22, 23, are provided with oil pockets or channels 33 which receive lubricant running thereto from the troughs or channels 8 above mentioned, this lubricant being thence conducted through apertures 34 to the grooves 35 provided in the bearings 26 and 30, these grooves having the oil ducts 37 leading therefrom whereby the lubricant is brought into contact with the outer surface of the spindle ends, as for instance by virtue of the channels 39 and the annular grooves 38. Excess of oil will pass along the lower ducts 39 and through the apertures 50 back into the oil well 19. Furthermore, a supply of oil which may be so excessive as to more than fill the channels 33 in the tops of the annular members 22 and 23 will overflow in to the surrounding annular spaces 60 and also fall into the well 19.

The spindle S is in the present instance driven by the pulleys 14 and 15 secured upon the opposite ends thereof and held in place by nuts 40, 41, respectively.

From the above description it will be understood that after either of the nuts 40, 41 have been loosened from the spindle end, a retrograde rotation of the cap 28 or 32, as the case may be, will result in forcing the pulley on that respective end outward.

It will also be seen that by virtue of the longitudinal adjustment of the bearingholder 22 relative to the holder 23, any longitudinal movement of the spindle may be entirely taken up. Furthermore, inasmuch as the ends of the spindle are tapered, it is self evident that by sliding the bearingsleeves 26 and 30 axially in their holders, a true running fit may readily be obtained, and that, furthermore, ample lubrication is provided for the several parts.

In some cases it may be desirable to be able to re-fill or supply fresh lubricant to the casing directly through the spindle, and I have, therefore, provided the latter with a longitudinally disposed passage-way 45 which is in communication with a radial branch 46 in the spindle itself, and which may be closed by a screw or similar device 47.

The lubricant contained in the casing well may be withdrawn therefrom by removing a screw or plug 48 disposed near the bottom of said well.

Many changes may be made in the construction and organization of the several parts constituting my improved bearing, and also in the general organization thereof, together with the connecting oil channels and grooves.

It is also evident that other means may be employed in lieu of the lubricant-distributing flange to accomplish the same result, the principal features of which are the transfer of lubricant from the bottom of the inclosed oil-chamber or well toward the top or roof of the bearing from which point the lubricant may gravitate to the running parts of the bearing irrespective of the construction or the relative positions which these parts may have to each other. In other words, that ample provision is made for the adjustment of these parts longitudinally without in any way interfering with the intercommunication of the several ducts and grooves.

I claim:

1. In combination, an inclosed casing including a lubricant receptacle therein, annular bearing supports fitted in the opposite ends of the casing, arranged with spaces between the tops of their inner end portions and the roof of the casing, and each having a duct in its upper portion in communication with said space and downwardly continued and terminating in the central opening therein, annular journal bearing members in each bearing support, each having a duct in its upper portion which terminates at the central opening therein, a spindle rotatably fitted in the said bearing members and having a revoluble oil distributer located between the inner ends of such members and entering the lubricant containing lower portion of the casing, and a sidewise open trough like conductor arranged longitudinally within the roof of the casing and having at the opposite extremities thereof communications with, and for oil delivery in opposite directions into, the ducts in the inner upper portions of the bearing supports.

2. In a lubricating device, in combination, a casing or spindle bearing head, having an opening in a portion thereof and containing a lubricant receptacle therein, a bearing support, and a bearing member which enters the support through the said opening in the casing, a spindle journaled in said bearing member, and a revoluble oil distributer which enters the oil well, a trough-like conductor located within the casing and having a portion thereof adapted to receive oil thrown upwardly by the said distributer and another portion adapted for delivery or outlet, means for closing the opening in the casing, and means for conducting lubricant delivered from the outlet of said trough to the said bearing member and spindle.

3. In a self-lubricating device, in combination, a double end casing or head containing an oil well, and having an opening in a portion thereof, bearing supports with bearing members therein, one of said bearing members entering its support through the said opening in the casing, a spindle journaled in said bearing members and having an oil distributer between such bearing members, revoluble with the spindle and entering the oil well, a trough-like conductor within the casing, and having a portion thereof adapted to receive oil thrown upwardly by said distributer and another portion adapted for discharge or outlet, means for closing the opening in the casing, and means for conducting lubricant delivered from the outlet of said trough to the said spindle.

4. In a self-lubricating spindle bearing device, in combination, an inclosed casing or head having a chamber for containing lubricant therein, an endwise apertured bearing support therein, which has a portion thereof so formed and arranged in relation to the roof of the casing as to leave an open space between it and such roof, a bearing member which enters the bearing support from the outer end thereof, a spindle journaled in said bearing member, and having a revoluble oil distributer which enters said lubricant chamber, a trough-like conductor fixed within said casing, and having a sidewise opening into which lubricant may be thrown by said revoluble distributer, and having its outlet portion thereof located above said open space, and means in communication with said open space for oil delivery to the bearing member and to the spindle.

5. In a lubricating device, in combination, an endwise open casing or bearing head, having an oil receptacle in the lower portion, a bearing support, a bearing member which enters its support through the endwise opening in the casing, a spindle journaled in said bearing member and a revoluble oil distributer which enters the oil well, a trough-like conductor located within the casing and having a portion thereof adapted to receive oil thrown upwardly by said oil distributer, the said trough having its end portion or outlet thereof extending into and surrounded by an open space, formed in the said bearing support, a cap for closing the endwise opening in the casing, and means for conducting lubricant from the said open space, through the bearing support and bearing member, to the spindle.

6. In a lubricating device, in combination, a casing, or spindle bearing head, having an opening in a portion thereof and having a chamber for containing lubricant therein, bearing supports and bearing members in opposite ends of the said bearing head, one of the bearing members entering its support through the said opening in the casing, a spindle journaled in said bearing members and a revoluble oil distributer which enters the oil well, a trough-like conductor within the casing, and having a portion thereof adapted to receive oil thrown upwardly by the said distributer and arranged for discharge or outlet, means for conducting oil delivered from said trough to said spindle, and means for closing the said opening in the casing.

7. In a self-lubricating spindle bearing device, in combination, a casing containing an oil well therein, the said casing having an opening in an end portion thereof, a bearing support, a bearing member which enters its support through the said opening in the casing, a spindle journaled in said bearing member, and a revoluble oil distributer, entering the oil well, and carried with the spindle, in its rotation, a trough-like conductor within the casing, and having a portion thereof arranged to receive oil thrown upwardly by said oil distributer, and having a discharge portion thereof in communication with an opening, formed in the said bearing support, a cap for closing the said opening in the casing, and means for conducting lubricant from the said opening in the bearing support to said bearing member and spindle.

8. In a self-lubricating spindle bearing device, in combination, an endwise open casing or bearing head, having an oil receptacle in its lower portion, a bearing support, a bearing member which enters its support through the open end of the casing, a spindle journaled in said bearing member and beyond the inner end of said bearing member, a revoluble oil distributer, entering the oil well, and carried with the spindle in its rotation, a trough-like conductor having a portion thereof adapted to receive oil thrown upwardly by the said oil distributer and another portion thereof formed for discharge or outlet, a cap for closing the open end of the casing, and means for conducting lubricant from the said trough to the said bearing member and spindle.

9. In a self-lubricating spindle bearing device, in combination, a double end casing or head having an endwise aperture therein, and containing an oil receptacle in its lower portion, bearing supports and bearing members in the opposite ends of the said bearing head, one of said bearing members entering its support through the said open end of the casing, a spindle journaled in said bearing members and between the inner ends of said bearing members, a revoluble oil distributer, entering the oil well, and carried in its rotation with spindle, a trough-like conductor, having a portion thereof adapted to receive oil thrown upwardly by the said oil distributer and another portion thereof formed for discharge or outlet, a cap for closing the endwise opening in the casing, and means for conducting lubricant from the said oil conductor to the said bearing member and spindle.

Signed by me at Springfield, Mass., in presence of two subscribing witnesses.

FREDERICK D. VAN NORMAN.

Witnesses:
H. L. SPRAGUE,
WM. S. BELLOWS.